UNITED STATES PATENT OFFICE.

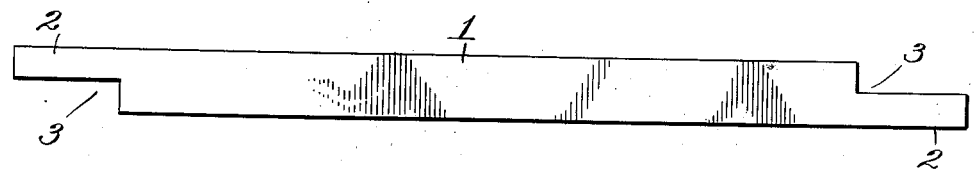
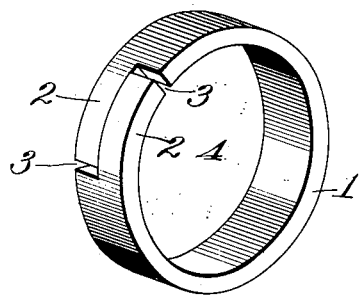
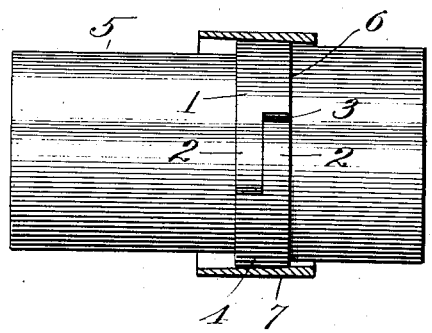
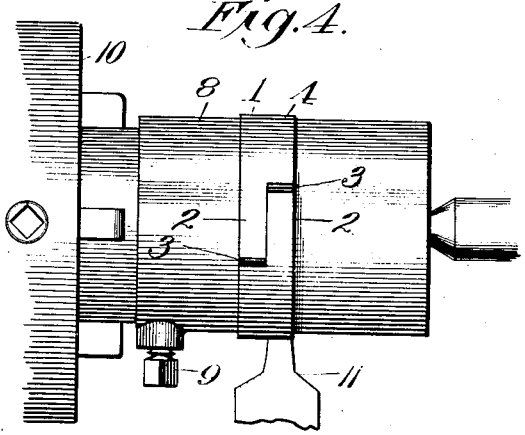

WILLIAM GEISER, OF NEODESHA, KANSAS.

PROCESS OF MAKING PISTON-PACKING RINGS.

938,420. Specification of Letters Patent. Patented Oct. 26, 1909.

Application filed January 18, 1909. Serial No. 473,005.

*To all whom it may concern:*

Be it known that I, WILLIAM GEISER, a citizen of the United States, residing at Neodesha, in the county of Wilson and State of Kansas, have invented certain new and useful Improvements in Processes of Making Piston-Packing Rings, of which the following is a specification.

This invention relates to resilient piston-packing-rings and the process of making the same has for its object to produce a resilient packing ring having overlapping ends and of uniform radius at all points, and which externally forms a perfect cylinder, a further object being to evolve a novel method or process for producing such rings.

In the accompanying drawing Figure 1, is a plan view of a ribbon of resilient material from which a piston packing ring is adapted to be formed. Fig. 2, is a perspective view of a ring formed by bending a ribbon of the type shown in Fig. 1, to circular form. Fig. 3, is a side view showing the ring compressed on a core by a ring-shaped wedge. Fig. 4, is a view showing the ring clamped in its compressed condition on the core and mounted in a lathe wherein it may be turned to a perfect circle externally by means of a cutting tool.

In the production of these rings, a ribbon 1 of resilient material and proper size is cut at its ends to form tongues 2 and recesses 3 for mutual engagement, the adjacent side edges of such tongues being planed so as to form an absolutely perfect joint when fitted together. The ribbon is then rolled to form a ring 4 with said planed edges in engagement and then the ring is slipped on a cylindrical core 5 corresponding in diameter to the part upon which the said ring is adapted to be ultimately secured, the core being preferably formed with an integral shoulder 6 against which the ring bears. A sleeve 7 of suitable internal diameter is then driven over the ring to compress it to the required extent, and while thus compressed inwardly by the sleeve, longitudinal pressure is applied upon the ring to clamp the same against the shoulder of the core to prevent the expansion of said ring; said means for applying longitudinal pressure upon the ring being a collar 8 by preference, which collar is slipped upon the core, and secured rigidly at the desired point of adjustment thereon by a set-screw 9, as shown in Fig. 4. The sleeve is then removed and the ring while held under compression on the core is placed with the latter in a lathe 10 and turned down by a tool 11 until the periphery of the ring is a perfect circle of the required size. By this method or process an absolutely perfect ring may be produced from a single piece of resilient material with the tongues forming a perfect joint and of any desired lap or shape.

Heretofore rings have sometimes been made from sections of perfectly circular tubes, the sections being cut or slit from one edge to the other and then filed or otherwise cut to produce tongues or recesses for mutual engagement, the rings being then compressed so as to cause the tongues to overlap. A ring of this character does not form a true or perfect circle as it must be distorted in order to cause the ends of the tongues to overlap, it being obvious that the ends of such tongues must be coincidental to form a perfect circle if the ring is produced from a section of tubing. Another method of making packing rings is to cut a circumferential slot in the ring parallel with its sides and then cut through the portions of the ring at opposite ends of the slot from opposite sides of the ring. By this method overlapping ends are produced without distorting the ring but as a result of the production of the slot the overlapped ends do not engage and make a perfect joint, and to accomplish this without twisting, a strip of metal is fitted in the slot as a filler, the securing of the extra strip or piece in the slot materially increasing the expense of the ring and facilitating its deterioration.

From the above description it will be apparent that I have evolved a novel method or process for manufacturing initially-perfect resilient packing rings at small cost, it being understood that a number of such rings can be compressed and turned at the same time. All other packing rings of which I have knowledge made from a single piece of resilient material with overlapping ends fitted together to make a fluid-tight joint, are initially imperfect and become perfect by wear after considerable service.

What I claim and desire to secure by Letters-Patent is:—

1. The process of making resilient rings, the same consisting in forming recesses and tongues at the opposite ends of a ribbon of resilient material, then planing the side edges of the tongues so that when fitted together they shall form a fluid-tight joint, and then rolling the ribbon to ring form to cause the tongues and recesses to mutually engage with the tongues overlapping and their planed edges fitted together.

2. The process of making resilient rings, the same consisting in forming recesses and tongues at the opposite ends of a ribbon of resilient material, then planing the side edges of the tongues so that when fitted together they shall form a fluid-tight joint, then rolling the ribbon to ring form to cause the tongues and recesses to mutually engage with the tongues overlapping and their planed edges fitted together, then slipping the ring on a cylindrical core of predetermined diameter, then compressing the ring until it is reduced to the size desired, then in securing the ring in its reduced condition, and then in placing the core and ring in a lathe and turning the ring down until its periphery is of predetermined diameter and is a perfect circle.

3. The process of making resilient rings, and same consisting in forming recesses and tongues at the opposite ends of a ribbon of resilient material, then planing the side edges of the tongues so that when fitted together they shall form a fluid-tight joint, then rolling the ribbon to ring-form to cause the tongues and recesses to mutually engage with the tongues overlapping and their planed edges fitted together, then slipping the ring on a cylindrical core of predetermined diameter, then compressing said ring until it is reduced to the required size, then in applying longitudinal pressure on the ring to clamp it in its compressed condition, and then in turning said ring down until its periphery is a perfect circle of predetermined diameter.

4. The process of making resilient rings, the same consisting in forming recesses and tongues at the opposite ends of a ribbon of resilient material, then planing the side edges of the tongues so that when fitted together they shall form a fluid-tight joint, then rolling the ribbon to ring form to cause the tongues and recesses to mutually engage with the tongues overlapping and their planed edges fitted together, then slipping the ring on a cylindrical core of predetermined diameter, then driving a sleeve over the ring and core to compress the former, then in applying longitudinal compression on the ring to retain it in such condition, then in removing the sleeve, and then in placing the core and ring in a lathe and turning the ring down until its periphery is of predetermined diameter and is a perfect circle.

In testimony whereof I affix my signature, in the presence of two witnesses.

WILLIAM GEISER.

Witnesses:
C. O. PINGREY,
A. E. LEES.